United States Patent
Sheinin et al.

(10) Patent No.: US 12,380,106 B2
(45) Date of Patent: Aug. 5, 2025

(54) REDUCING INFERENCE TIME PROCESSING DEEP LEARNING MODELS

(71) Applicant: INTERNATIONAL BUSINESS MACHINES CORPORATION, Armonk, NY (US)

(72) Inventors: Vadim Sheinin, Yorktown Heights, NY (US); Irene Lizeth Manotas Gutierrez, White Plains, NY (US); Hangu Yeo, Westchester, NY (US); Octavian Popescu, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/188,970

(22) Filed: Mar. 23, 2023

(65) Prior Publication Data
US 2024/0320222 A1 Sep. 26, 2024

(51) Int. Cl.
*G06F 7/00* (2006.01)
*G06F 16/242* (2019.01)
*G06F 16/2453* (2019.01)

(52) U.S. Cl.
CPC .... *G06F 16/24547* (2019.01); *G06F 16/2433* (2019.01)

(58) Field of Classification Search
CPC .......... G06F 16/24547; G06F 16/2433; G06F 16/116; G06F 16/2386
See application file for complete search history.

(56) References Cited

U.S. PATENT DOCUMENTS

| | | | |
|---|---|---|---|
| 6,615,172 B1 * | 9/2003 | Bennett | G06F 16/374 704/E15.047 |
| 7,136,850 B2 * | 11/2006 | Keller | G06F 16/24545 |
| 10,714,058 B2 | 7/2020 | Diederich | |
| 11,561,946 B1 * | 1/2023 | Jiang | G06N 7/01 |
| 11,734,269 B2 | 8/2023 | Erdmann et al. | |
| 11,734,510 B2 * | 8/2023 | Hu | G06F 40/30 704/9 |

(Continued)

FOREIGN PATENT DOCUMENTS

| | | |
|---|---|---|
| CN | 108665429 A | 10/2018 |
| CN | 112348176 A | 2/2021 |

(Continued)

OTHER PUBLICATIONS

Yale University, "Spider 1.0 Yale Semantic Parsing and Text-to-SQL Challenge", https://yale-lily.github.io/spider, referenced on Mar. 23, 2023 (12 pages).

(Continued)

*Primary Examiner* — Mohammed R Uddin
(74) *Attorney, Agent, or Firm* — Steven M. Bouknight

(57) ABSTRACT

Various embodiments are provided herein for decreasing a central processing unit (CPU) inference time, thereby shortening processing time of a deep learning model for which run-time complexity is proportional to an output sequence length. A compacted sequence is developed that is used to train the deep learning model. An output of the trained model becomes the compacted sequence on which a post-processing method operates to create an uncompacted version of a predicted sequence.

17 Claims, 11 Drawing Sheets

(56) References Cited

U.S. PATENT DOCUMENTS

| | | | | |
|---|---|---|---|---|
| 11,789,945 | B2* | 10/2023 | Lee | G06N 3/044 |
| | | | | 707/760 |
| 2003/0088548 | A1* | 5/2003 | Kumar | G06F 16/24534 |
| 2007/0239669 | A1* | 10/2007 | Ordonez | G06F 16/24522 |
| 2012/0016901 | A1* | 1/2012 | Agarwal | G06F 16/258 |
| | | | | 707/769 |
| 2014/0095469 | A1* | 4/2014 | Chen | G06F 16/3325 |
| | | | | 707/E17.054 |
| 2017/0322974 | A1* | 11/2017 | Hoffmann | G06F 16/24535 |
| 2017/0351511 | A1* | 12/2017 | Bar-Or | G06F 8/34 |
| 2018/0157978 | A1* | 6/2018 | Buda | G06N 20/00 |
| 2019/0272296 | A1* | 9/2019 | Prakash | G06F 16/243 |
| 2020/0257679 | A1* | 8/2020 | Sheinin | G06N 3/08 |
| 2021/0056108 | A1* | 2/2021 | Shmueli | G06N 3/08 |
| 2021/0209501 | A1* | 7/2021 | Sarferaz | G06F 9/547 |
| 2021/0224281 | A1* | 7/2021 | Lee | G06F 16/24561 |
| 2021/0357402 | A1* | 11/2021 | Cheng | G06Q 30/0202 |
| 2021/0390099 | A1* | 12/2021 | Rahmfeld | G06F 16/24522 |
| 2022/0027719 | A1 | 1/2022 | Wagner | |
| 2022/0129450 | A1* | 4/2022 | Cao | G06F 16/2433 |
| 2022/0284023 | A1* | 9/2022 | Li | G06F 16/24537 |
| 2022/0358125 | A1* | 11/2022 | Scholak | G06F 16/24522 |
| 2023/0186161 | A1* | 6/2023 | Arthur | G06F 40/58 |
| | | | | 704/2 |
| 2023/0252024 | A1* | 8/2023 | Qin | G06F 16/2453 |
| | | | | 707/609 |
| 2023/0274095 | A1* | 8/2023 | Kelkar | G06F 40/49 |
| | | | | 704/9 |
| 2023/0306022 | A1* | 9/2023 | Popescu | G06F 16/24522 |

FOREIGN PATENT DOCUMENTS

| | | |
|---|---|---|
| CN | 113377808 A | 9/2021 |
| CN | 108022039 B | 11/2021 |
| CN | 114218127 A | 3/2022 |
| CN | 114462571 A | 5/2022 |
| CN | 112287093 B | 8/2022 |
| CN | 116186079 B | 7/2023 |
| CN | 116627786 A | 8/2023 |

OTHER PUBLICATIONS

Nawrot et al., "Efficient Transformers with Dynamic Token Pooling", arXiv:2211.09761, Nov. 2022, (13 pages).

Li et al., "An Efficient Transformer Decoder with Compressed Sub-layers", arXiv:2101.00542, Jul. 2021, (9 pages).

* cited by examiner

| DB | QUESTION | PREDICTED SQL | INFERENCE TIME[S] | STRING LENGTH | INFERENCE TIME/CHAR |
|---|---|---|---|---|---|
| WH | WHO MANUFACTURED PHONE1 | SELECT T1.NAME FROM MANUFACTURERS AS T1 JOIN PRODUCTS AS T2 ON T1.MANUFACTURER_ID = T2.MANUFACTURER_ID WHERE T2.TYPE = 'PHONE1' | 5.094 | 127 | 0.0401 |
| WH | WHO MANUFACTURED PHONE2 | SELECT T1.NAME FROM MANUFACTURERS AS T1 JOIN PRODUCTS AS T2 ON T1.MANUFACTURER_ID = T2.MANUFACTURER_ID WHERE T2.TYPE = 'PHONE2' | 4.829 | 127 | 0.0380 |
| WH | WHEN DID RICHARD BUY | SELECT T1.DATE FROM SALES AS T1 JOIN CUSTOMERS AS T2 ON T1.CUSTOMER_ID = T2.CUSTOMER_ID WHERE T2.NAME = "RICHARD" | 3.831 | 113 | 0.0328 |
| WH | WHO BOUGHT AT STORE1 | SELECT T1.CUSTOMER_ID FROM SALES AS T1 JOIN SHOPS AS T2 ON T1.SHOP_ID = T2.SHOP_ID WHERE T2.NAME = 'STORE1' | 4.179 | 108 | 0.0386 |
| | | AVERAGE: | 4.279 | | 0.03647 |

FIG. 3

| DB | QUESTION | PREDICTED SQL | INFERENCE TIME[S] | STRING LENGTH | INFERENCE TIME/CHAR |
|---|---|---|---|---|---|
| WH | WHO MANUFACTURED PHONE1 | SELECT T1.NAME WHERE T2.TYPE = 'PHONE1' | 1.6846 | 42 | 0.0401 |
| WH | WHO MANUFACTURED PHONE2 | SELECT T1.NAME WHERE T2.TYPE = 'PHONE2' | 1.5972 | 42 | 0.0380 |
| WH | WHEN DID RICHARD BUY | SELECT T1.DATE WHERE T2.NAME = "RICHARD" | 1.3560 | 40 | 0.0328 |
| WH | WHO BOUGHT AT STORE1 | SELECT T1.CUSTOMER_ID WHERE T2.NAME = 'STORE1' | 1.8142 | 47 | 0.0386 |
| | | AVERAGE: | 1.613 | | 0.0361 |

FIG. 4

REDUCING INFERENCE TIME PROCESSING DEEP LEARNING MODELS

BACKGROUND

In computer programming, structured query language (SQL) is a standardized programming language that is used to manage relational databases and perform various operations on the data in them. So-called "Text-2-SQL" refers to the tasks of transforming a question (in natural language format) into an executable SQL query. From the perspective of deep learning networks (DL), text-2-SQL is a translation process. As one skilled in the art will appreciate, the DL approach requires training data for creating a model. So-called "Spider Corpus," which in one embodiment, may be located at https://yale-lily.github.io/spider, is a widely-used examples of a training data repository, including thousands of unique questions that are cross referenced to thousands of unique, complex SQL queries on hundreds of databases.

Foundation Models (e.g., transformed-based models like T5) have been shown to have top performance on several Natural Language Processing (NLP) tasks, including Text-2-SQL, and translate a natural language question to its corresponding SQL query.

Clients typically do not have access to graphics processing units (GPUs) needed to run foundations models quickly. Instead, clients usually seek models that can be run on a Central Processing Unit (CPU) with high accuracy and low execution.

Transformers-based models like T5, having an Encoder-Decoder architecture, usually run very slow in a CPU environment, compared to its typical runtime on a GPU. The overall inference time is dominated by the decoder and is directly proportional to the number of characters of the output SQL query. In some cases, the encoder runs only once, but the decoder runs as many times as characters in the output sequence require. Thus, in situations where CPU use results in longer inference, and thereby processing times for deep learning applications, a need exists to develop solutions to shorten processing times when performing these tasks.

SUMMARY

According to an embodiment of the present invention, a method for decreasing a central processing unit (CPU) inference time, thereby shortening processing time of a deep learning model for which run-time complexity is proportional to an output sequence length, is provided. A compacted sequence is developed that is used to train the deep learning model. An output of the trained model becomes the compacted sequence on which a post-processing method operates to create an uncompacted version of a predicted sequence.

An embodiment includes a computer usable program product. The computer usable program product includes a computer-readable storage device, and program instructions stored on the storage device. The program instructions are used to develop a compacted sequence that is used to train the deep learning model. An output of the trained model becomes the compacted sequence on which a post-processing method operates to create an uncompacted version of a predicted sequence.

An embodiment includes a computer system. The computer system includes a processor, a computer-readable memory, and a computer-readable storage device, and program instructions stored on the storage device for execution by the processor via the memory. When executing the program instructions, the processor develops a compacted sequence that is used to train the deep learning model. An output of the trained model becomes the compacted sequence on which a post-processing method operates to create an uncompacted version of a predicted sequence.

Optionally, in certain embodiments, a formal language is used which is constrained to a grammar mechanism, and the grammar mechanism is implemented to create the uncompressed version of the predicted sequence.

Optionally, in certain embodiments, the post-processing method is executed, and the uncompacted version of the predicted sequence is created.

Optionally, in certain embodiments, during a training phase: at least one of a column name, a value in question, and a query is replaced by a shorter one of a column name, a shorter value in question, and a shorter query, and during an inference phase, reversing the shorter one of the column name, the shorter value in question, and the shorter query with the at least one of the column name, the value in question, and the query.

Optionally, in certain embodiments, developing the compacted sequence used to train the deep learning model further includes transforming a SQL query to a compacted, pseudo-SQL sequence for training a Text-2-SQL DL model.

Optionally, in certain embodiments, the Text-2-SQL DL model is used on a short-length pseudo-SQL dataset.

Optionally, in certain embodiments, the length of an SQL query is shortened using an automatic Short-SQL-Transform process by removing a FROM clause.

BRIEF DESCRIPTION OF THE DRAWINGS

FIG. 3 is a spreadsheet diagram illustrating an average inference time for a deep learning model to generate a predicted SQL query in a conventional environment.

FIG. 4 is a is a spreadsheet diagram illustrating a significantly reduced average inference time to generate a shortened, predicted SQL query (e.g., "Pseudo-SQL"), in accordance with an exemplary embodiment of the mechanisms of the present invention.

DETAILED DESCRIPTION OF THE DRAWINGS

Figure 1:
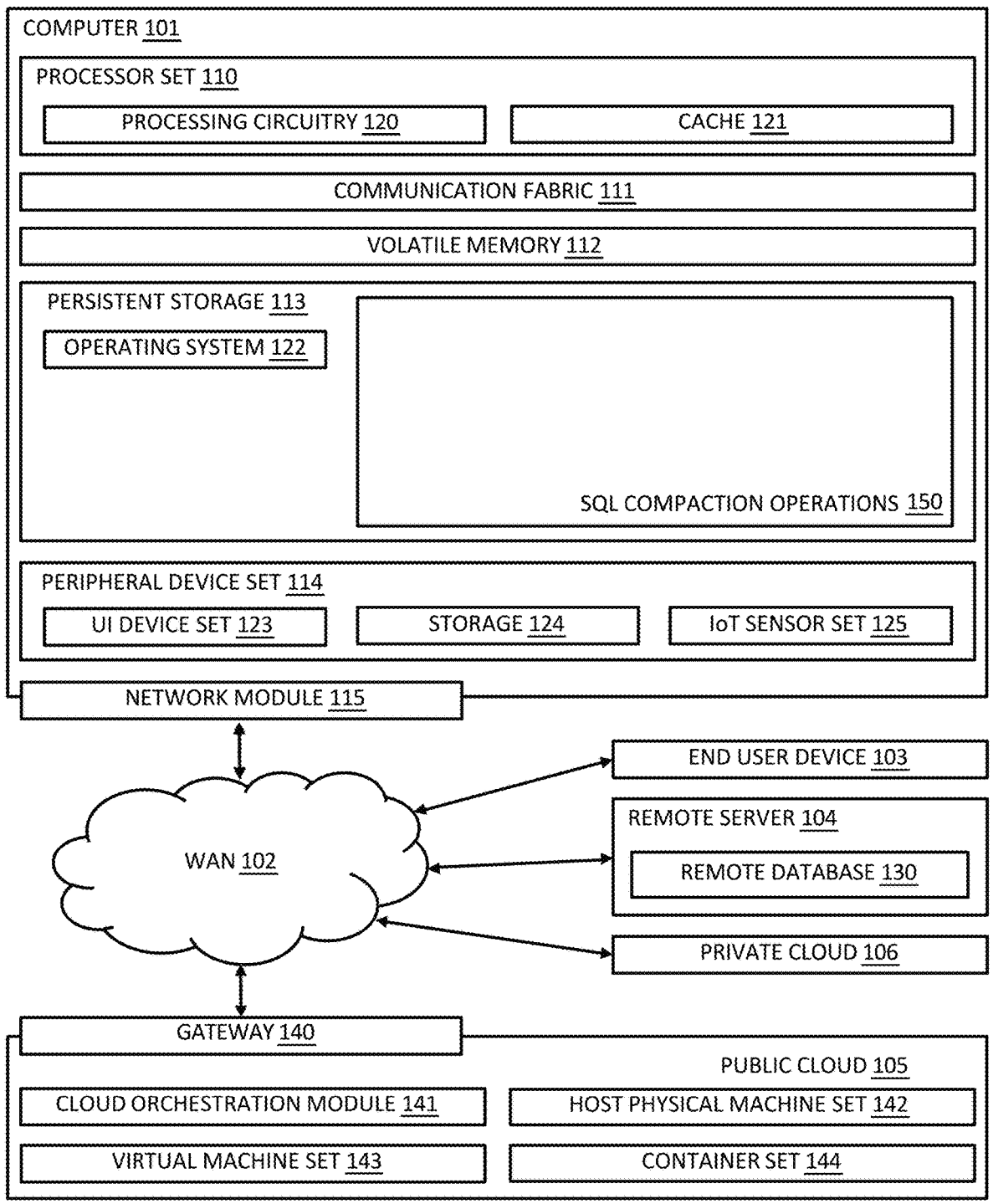
FIG. 1 is a block diagram depicting a computing environment according to an embodiment of the present invention.

As previously mentioned, so-called "Text-2-SQL" refers to the tasks of transforming a question (in natural language format) into an executable SQL query. From the perspective of deep learning networks (DL), text-2-SQL is a translation process. As one skilled in the art will appreciate, the DL approach requires training data for creating a model. So-called "Spider Corpus," which in one embodiment, may be located at https://yale-lily.github.io/spider, is a widely-used examples of a training data repository, including thousands of unique questions that are cross referenced to thousands of unique, complex SQL queries on hundreds of databases.

Foundation Models (e.g., transformed-based models like T5) have been shown to have top performance on several Natural Language Processing (NLP) tasks, including Text-2-SQL, and translate a natural language question to its corresponding SQL query.

Clients typically do not have access to graphics processing units (GPUs) needed to run foundations models quickly. Instead, clients usually seek models that can be run on a Central Processing Unit (CPU) with high accuracy and low execution.

Transformers-based models like T5, having an Encoder-Decoder architecture, usually run very slow in a CPU environment, compared to its typical runtime on a GPU. The overall inference time is dominated by the decoder and is directly proportional to the number of characters of the output SQL query. In one embodiment, the encoder runs only once, but the decoder runs as many times as characters in the output sequence require.

To address situations such as the one previously described where CPU use results in longer inference, and thereby processing times for deep learning applications, various aspects of the mechanisms of the illustrated embodiments are proposed to, among other aspects, transform an input sequence to a shorter sequence to speed up the CPU inference time of deep learning models for which run-time complexity is proportional to the output sequence length (e.g., transformed-base models). This shorter sequence, or "compacted sequence" is used to train a transformed-based model on a specific task, for example. The output of the trained model will, in one embodiment, thereby will be a compacted sequence on which a post-processing method operates to create a full version of the predicted sequence. For formal languages constrained to a grammatical aspects, the mechanisms of the illustrated embodiments may, in one example, utilize the grammatical aspects to re-create the full, original version of the predicted sequence.

In additional embodiments, various aspects of the present invention provide mechanisms to transform SQL queries to a shorter, "Pseudo-SQL" version for training, again for example, a Text-2-SQL DL model, and use fast post processing methods to compose the final SQL query, thus speeding up CPU inference time while maintaining the deep learning model's accuracy. In one example, a method is provided, as implemented through a computer code executing on a computer processing device, to minimize CPU interference time of transformers-based Text-2-SQL by training on short length Pseudo-SQL datasets.

In further embodiments, various mechanisms are provided which implement an automatic Short-SQL-Transform process, which, in one aspect, shortens the length of a conventional SQL query by removing the "FROM" clause. Column names, in one exemplary embodiment, are automatically replaced by shorter names during training. During inference, the shortened column names are reversed back to the original names/nomenclature. Values in question and query are automatically replaced by shortened values. During inference, short values are reversed back to original values. An automatic Full-SQL-Transform process recreates the full SQL from the pseudo-SQL predicted by the Text-2-SQL Deep Learning model.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, as may be used herein, "optimize" may refer to and/or defined as "maximize," "minimize," "best," or attain one or more specific targets, objectives, goals, or intentions. Optimize may also refer to maximizing a benefit to a user (e.g., maximize a trained machine learning scheduling agent benefit). Optimize may also refer to making the most effective or functional use of a situation, opportunity, or resource.

Additionally, optimizing need not refer to a best solution or result but may refer to a solution or result that "is good enough" for a particular application, for example. In some implementations, an objective is to suggest a "best" combination of operations, schedules, PE's, and/or machine learning models/machine learning pipelines, but there may be a variety of factors that may result in alternate suggestion of a combination of operations, schedules, PE's, and/or machine learning models/machine learning pipelines yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as SQL query compaction operation code 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices.

Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As previously mentioned, the illustrated embodiments of the present invention introduce, among other aspects, mechanisms for speeding up CPU inference time while maintaining a Deep Learning model's accuracy, for example, of a Text-2-SQL DL model, through the transformation of SQL queries. For example, an automatic Short-SQL Transform process reduces the length of an SQL query, by removing the FROM clause, and performing mapping to shorter table, column, value, and keyword mappings. Tables and columns are sorted lexicographically, and shorter names are used instead of original names (e.g. T1 in lieu of Table 1), before query execution column names are mapped back to original names.

In further embodiments, a trained Deep Learning (DL) model on Pseudo-SQL queries is used to predict Pseudo-SQL queries. A Full-SQL-Transform process introduces back from the FROM clause, along with other mappings, to an inferred Pseudo-SQL query generated by a DL model. Short-SQL-Transform processes, according to those as will be described herein in accordance with the mechanisms of the present invention, may reduce the original SQL queries used during training, by mapping keywords and values to shorter words (e.g., SELECT becomes S #, and "UNIT_4_BUSINESS_NY" becomes "V1"). The Pseudo-SQL Query Transformation Process improves the Inference time of the Text-2-SQL model as processed on a CPU, again as will be further described.

To briefly summarize a previously described embodiment thus far, a Text-2-SQL dataset is updated to shorten Pseudo-SQL queries using a Short-SQL-Transform protocol. A Deep Learning model is then trained (e.g., transformer-based model) on a particular Pseudo-SQL dataset (e.g., Spider after transformation to Pseudo-SQL). Finally, during an inference phase, the trained Deep Learning model is leveraged to generate the Pseudo-SQL, and pass the compressed queries to a Full-SQL-Transform process, to regenerate the uncompressed, final SQL.

To transform SQL queries into a shorter, compressed Pseudo-SQL Representation, in one embodiment, a Short-SQL-Transform process may be implemented. This transform process converts table names, column names, values and keywords, for example. As a next step, the "FROM" clause is removed. Finally, "NESTED" clauses are designated with { } brackets, versus ( ) parentheses. In one embodiment, as a result, parentheses are used to designate other components of SQL queries, but curly brackets are reserved for nested queries. Once the Pseudo-SQL is returned into postprocessing, the aforementioned curly brackets are then replaced with the original parentheses.

To regenerate the uncompressed, full SQL query, then the Full-SQL-Transform process may be leveraged to generate the final SQL by updating the inferred SQL from the model with the corresponding "FROM" clause and nested subqueries, if any, using a fast-post-processing transformation method.

Consider the following example of creating a compacted, Pseudo-SQL query from an original, uncompacted SQL query string. The uncompacted string reads as follows:

---

SELECT T1.name, T2.mgr_name FROM EMPLOYEE T1 JOIN MANAGER T2 T1.team_id=T2.team_id WHERE T1.salary > (SELECT T1.salary from EMPLOYEE T1 where T1.name="Richard") - 159

---

As one of ordinary skill in the art will appreciate, the above string contains a SELECT command making references to a Table 1, having a listing of employees, and a Table 2, having a listing of responsible managers. From the employees Table 1, the managers Table 2 is instructed to be collectively searched, with the nested precondition that the salary field in Table 1 be selected where the name field is equal to Richard, minus an offset value of 159.

As the complexity and thereby inference and processing time of an SQL query is directly related to the number of string characters presented in the query, the inference and processing time of the above example can consume a considerably larger amount of CPU time, versus a query with far fewer characters, again as one of ordinary skill in the art would appreciate.

Taking the example Pseudo-SQL transform process further, consider the following transformation step of the original SQL query:

---

SELECT T1.C1, T2.C2 WHERE T1.C4 > { SELECT T1.C5 WHERE T1.C1="RD" } - 67

---

Here, the fields T1.name, andT2.mgr_name are shown in a compacted form. T1.name becomes T1.C1 (ostensibly relating to column 1) and T2.mgr_name becomes T1.C2 (ostensibly relating to column 2). The "FROM" clause is removed as shown, and T1.salary becomes T1.C4. The parenthesis marking the beginning of a nested query is changed to a curly bracket, and the compacted schema continues with T1.C5 representative of T1.salary from employee T1, and continues further with where T1.C1="RD" ("Richard"). The curly bracket replacing the closed parenthesis is then shown.

Taking the example Pseudo-SQL transform process further, consider the following final transformation step of the original SQL query:

S# T1.C1, T2.C2 W# T1.C4 > { S# T1.C5 W# T1.C1="RD" } - 53 (Pseudo SQL)

Here, the Select commands are replaced with the shortened, compacted S #, and the Where commands are replaced with the shortened, compacted W # as shown. To summarize, then, the SQL queries are parsed, the SQL is decomposed in structural parts (e.g., SELECT items), the SQL is compacted by an algorithm that selects what parts are excluded (e.g., FROM clause) or modified (e.g., table names), and finally, the compacting algorithm makes sure that no ambiguities or inconsistencies are introduced.

As indicated, the final, Pseudo-SQL string contains a considerably less number of string characters, leading to the shortened inference and time for processing the compacted, Pseudo-SQL through a CPU as previously described, and again as one of ordinary skill in the art will appreciate.

Figure 2:
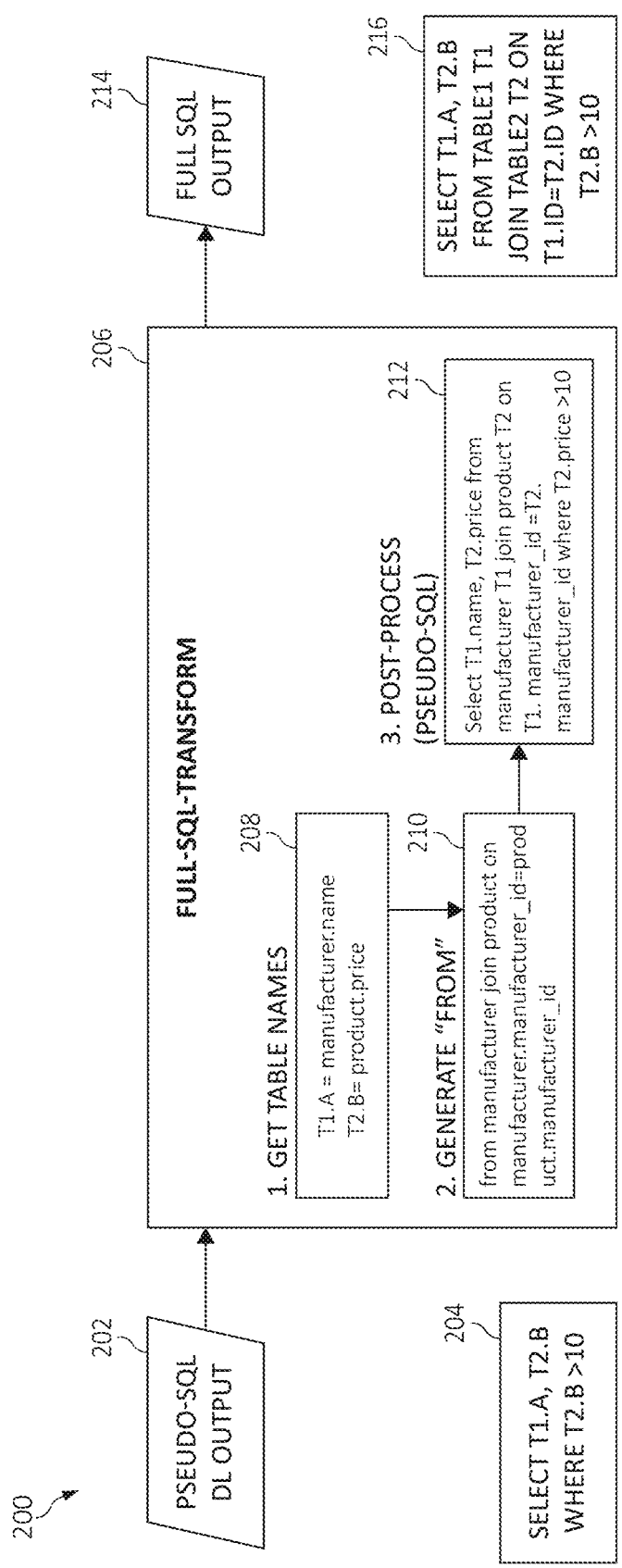
FIG. 2 is a block/flow chart diagram that depicts an exemplary transformation of an SQL query, in accordance with the mechanisms of the present invention.

Turning now to FIG. 2, consider the following block/flow diagram of an exemplary Full-SQL-Transform process 200, according to one embodiment of the present invention. A Pseudo-SQL-DL output 202 is provided as exemplary string 204 as shown in compacted form. The output 202 is then provided to the Full-SQL-Transform 206 as indicated. As a first step 208, the transform 06 regenerates the full table names 208 from the predicted output 202. Here, T1.A regenerates manufacturer.name, and T2.B regenerates product.price.

As a following step 210, the transform 06 regenerates the "FROM" clause as shown, which is then provided to post-processing step 212, which reconstructs the entire, uncompacted SQL string as indicated. The uncompacted SQL string is then provided as the full SQL output 214, which is represented as string 216 as shown. In the depicted embodiment, then, after obtaining the Pseudo-SQL or compacted SQL query from the Deep Learning model, the Full-SQL-Transform process takes into consideration the correct nesting structure (e.g., based on { ... { ... } ... }). Each query then requires an understanding of T1 .... TN tables and columns. Finally, the "FROM" clause is recreated, with the appropriate aliases and correct join path based on the process' knowledge of the schema.

Turning now to FIG. 3, an exemplary spreadsheet diagram 300 of a conventional processing methodology of a Text-2-SQL incorporating a Deep Learning model is shown. Column 302 references the particular database to be searched, column 304 is representative of the natural language presented (e.g., "who manufactured Phone1") as shown, column 306 represents the corresponding, predicted SQL query, column 308 shows corresponding inference time(s) for generating the predicted SQL query in column 306, the length of the corresponding string of the predicted SQL (in this case generally exceeding 100 characters in length) in column 308, and the corresponding inference time per character in column 312. Here, as indicated, each of the natural language questions results in a significantly long string of predicted SQL, taking a total average inference time 314 of 4.279 seconds to complete.

FIG. 4, in comparison, following, depicts spreadsheet 400 showing the shortened, compacted, Pseudo-SQL schema according to one embodiment of the present invention, and the resulting inference times. Column 402 again refers to the database "WH", and column 404 again refers to the natural language query presented. In the depicted example of spreadsheet 400, the predicted SQL using the Pseudo SQL format as previously described results in column 406 of string lengths (represented by column 410) of significantly less characters, with corresponding inference times (as shown in column 408) of considerably less time, and inference time per character (as shown in column 412) of considerably shorter duration as well. Accordingly, the average inference time for each of the depicted SQL queries results in 1.613 seconds to generate the Pseudo SQL, a more than two times reduction in processing time (and corresponding increase in processing speed).

Figure 5:
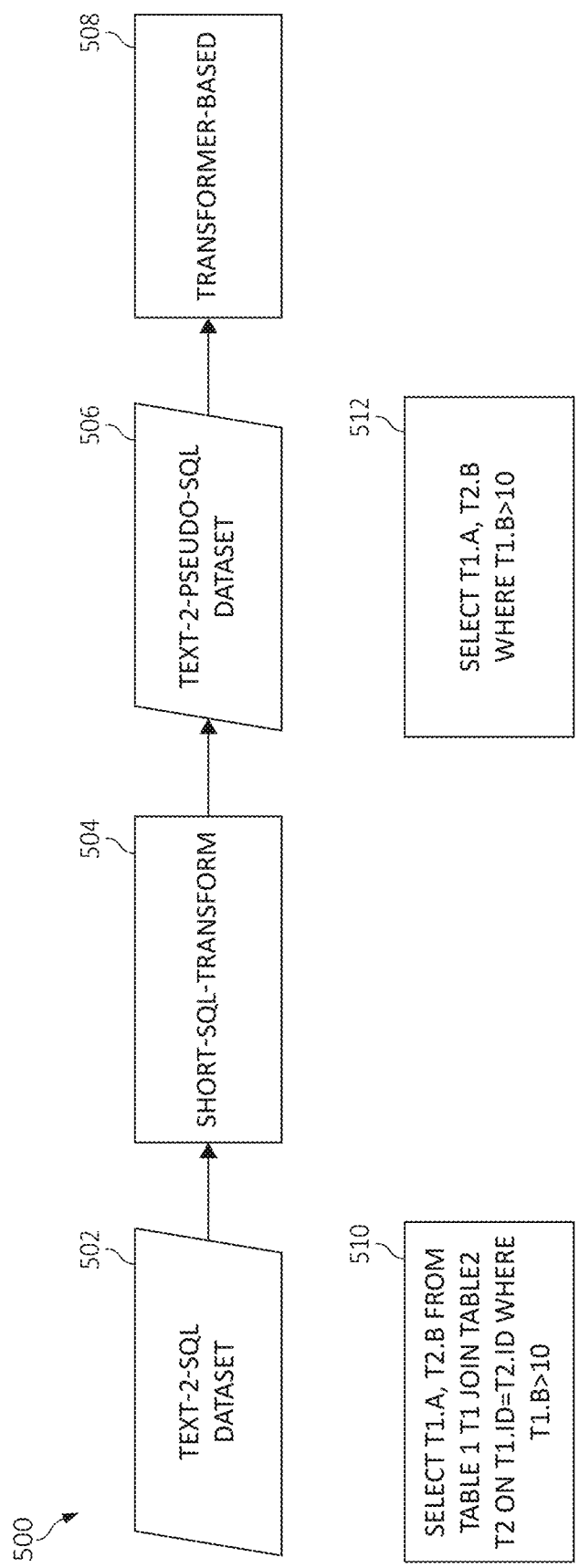
FIG. 5 is an additional block/flow diagram of an exemplary training phase where various aspects of the illustrated embodiments are brought to bear on an exemplary deep learning model.

Turning now to FIG. 5, method 500 shows an exemplary training phase for a transformed-based Text-2-SQL Deep Learning model, according to the mechanisms of the present invention. A Text-2-SQL dataset 502 with example string 510 as shown (having 78 characters) is provided to a Short-SQL-Transform process 504, which results in the depicted compacted string 512 (having 33 characters) of the Text-2-Pseudo-SQL-dataset 506. The compacted, Pseudo-SQL dataset is then used to train the transformer-based Text-2-SQL Deep Learning model 508 as shown.

Here again, the Short-SQL-Transform results in a one-half reduction in input size (e.g., 78 characters to 33 characters) for queries with joins. References to T1, T2, etc., referring to names of tables in the schema in the order they are listed, may be retained as shown.

Figure 6:
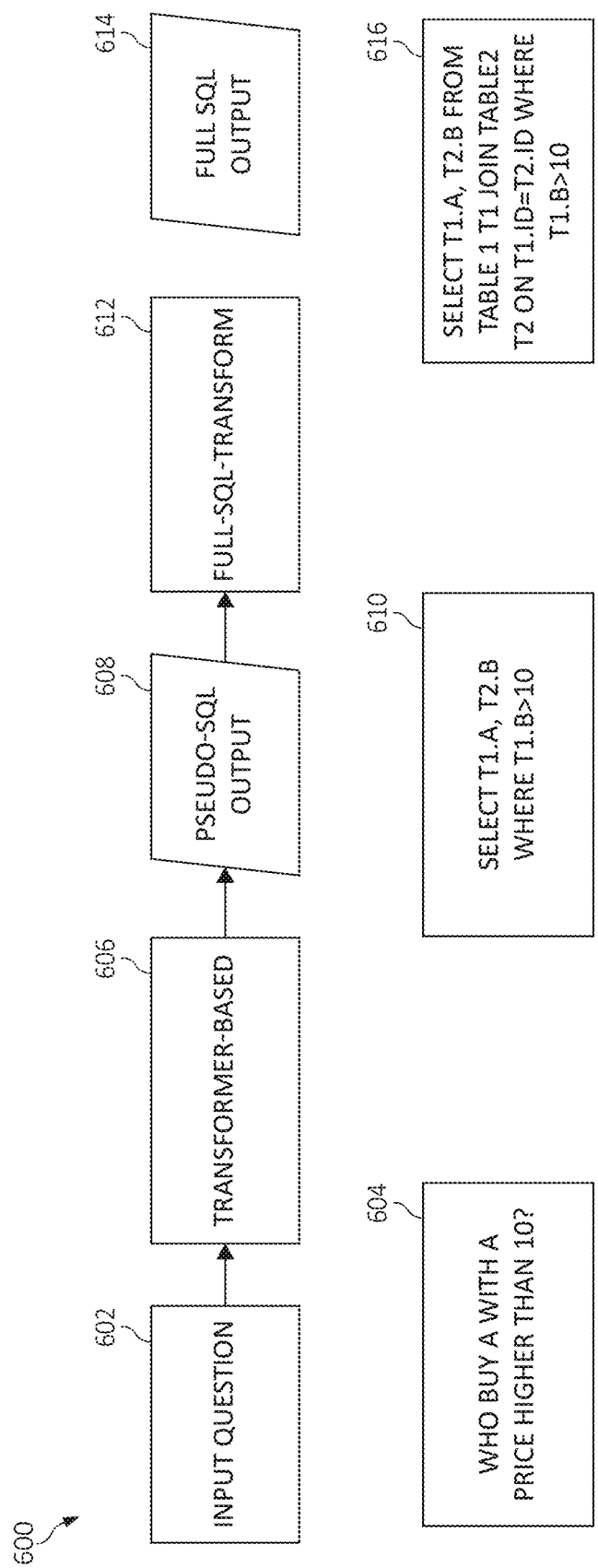
FIG. 6 is an additional block/flow diagram of an exemplary inference phase of the previously depicted deep learning model, where because of the aspects of the present invention utilized in the training phase as depicted in FIG. 5, previously, the time to infer full SQL is greatly reduced, as the decoder is predicting Pseudo-SQL rather than unmodified SQL queries.

Turning now to FIG. 6, following, an exemplary method 600 for performing an inference phase, is depicted, in accordance with the mechanisms of the present invention. A natural language input question 602 is shown as 604 as, "Who buys product A with a price higher than 10?" The natural language input is used to train a transformer-based Text-2-SQL Deep Learning model 606, to provide Pseudo-SQL output 608, shown as compacted string 610 (having 33 characters). The Pseudo-SQL output 608 is provided to Full-SQL-Transform 612 to regenerate full SQL output 614, depicted as string 616. Here again, the time to infer full SQL is greatly reduced, since the applicable decoder only needs to predict the indicated Pseudo-SQL instead of full SQL.

Figure 7:
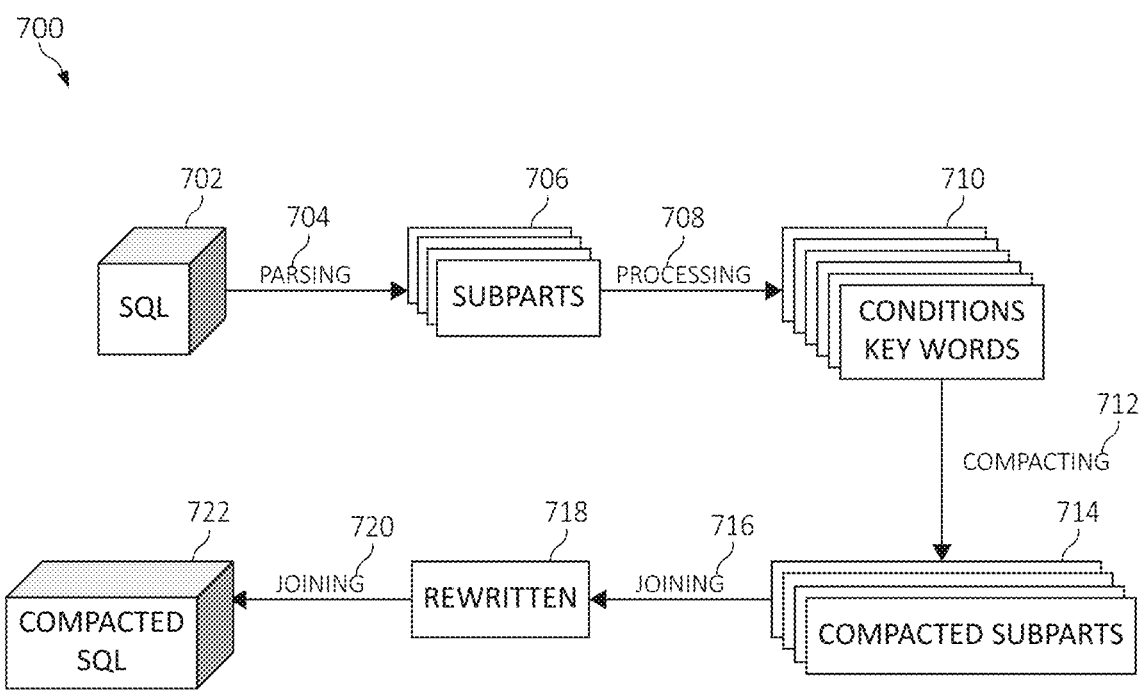
FIG. 7 is an additional block/flow diagram, depicting an exemplary compaction of SQL queries, in accordance with various aspects of the present invention.

Turning now to FIG. 7, a flow chart diagram of an exemplary compaction methodology 700 as part of a Short-SQL-Transform process, according to various aspects of the present invention, is depicted. Each SQL query 702 is then parsed 704 into subparts 706. Each subpart 706 is provided as input (as processing step 708) to a compacting algorithm that, in light of various conditions, key words, and other considerations (step 710) returns a compacted form of that SQL in a compacting step 712. In compacting step 712, among other aspects, functionality such as transforming table names, column names, values to shorter values, and consistency checks may occur. Once the compacted subparts 714 are obtained, they are joined together (step 716), provided to a rewriting operation that constructs the final string (step 718), rejoined (if necessary) (step 720), and provided as the completed, compacted SQL 722.

Figure 8:
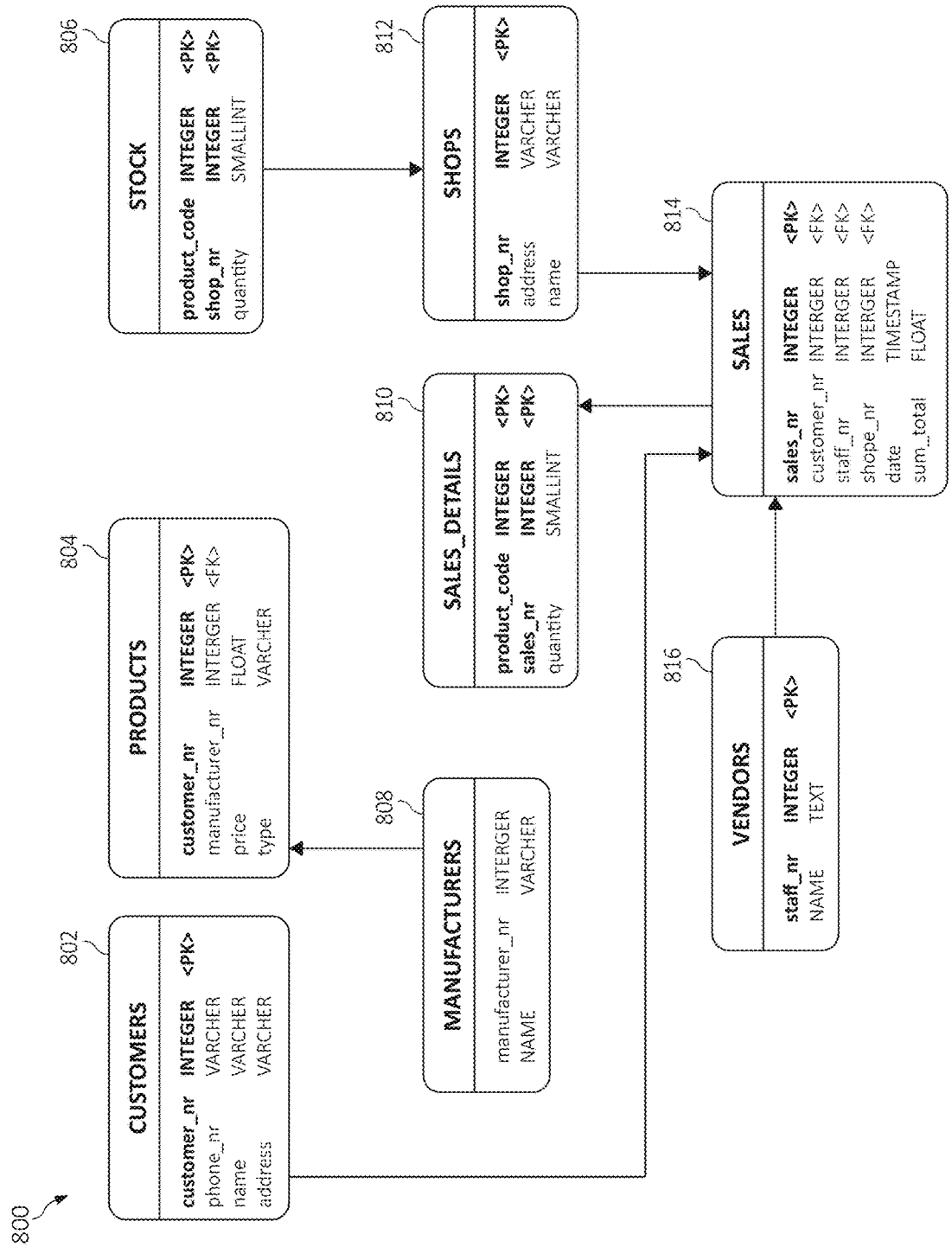
FIG. 8 is an additional block/flow diagram showing an exemplary schema constructed with scheme metadata in an offline process, in accordance with the mechanisms of the present invention.

FIG. 8, following, depicts an exemplary schema diagram 800, in which various attributes are leveraged in accordance with aspects of the present invention, for example, in regenerating a "FROM" clause in the reconstruction of an uncompacted SQL string from a given Pseudo-SQL input. Schema 800 depicts customers 802, manufacturers 808 which are connected to products 804, vendors 816 which are connected with sales 814 and in turn, sales_details 810, and stock 806 shown connected with shops 812 and then sales 814. Each of the various relationships and aspects of the schema 800 may be leveraged in a future step as will be described in generating a particular "FROM" clause.

Figure 9:
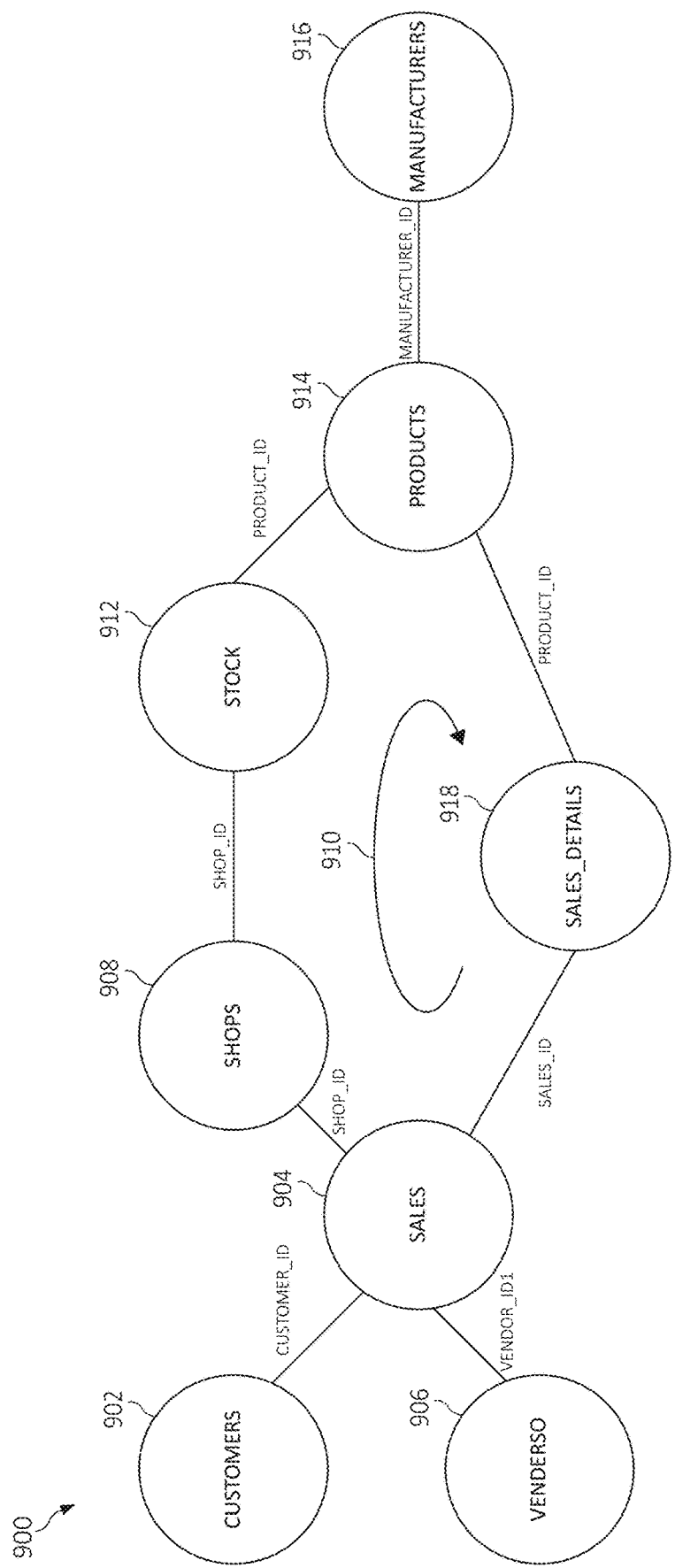
FIG. 9 is an additional block diagram showing an exemplary data model depicted as a connected graph having one or more undirected and unweighted links between any two nodes, in accordance with the mechanisms of the present invention.

In conjunction with FIG. 8, FIG. 9, following, depicts an exemplary data model 900, again in which aspects thereof are leveraged in accordance with various aspects of the present invention. In one embodiment, aspects of the schema diagram 800, and the data model 900, are utilized to generate and/or re-generate a "FROM" clause in a particular SQL query.

In FIG. 9, data model 900 shows as a connected graph that has one (or more than one) undirected and unweighted links between any two nodes. In the depicted example, data model 900 contains customers node 902, sales node 904, vendors node 906, shops node 908 that are connected via the depicted links (e.g., by SHOP_ID link connecting sales 904 to shops 908. In addition, data model 900 shows sales details node 918, refresh functionality 910, stock node 912, product node 914, and manufacturers node 916.

In one embodiment, data model 900 is constructed using schema metadata from schema diagram 800 as depicted, hence data model 900 becomes schema specific, and is built with schema metadata offline. In constructing data model 900, each of the node attributes are constructed using the schema metadata, such as node name as previously described, list(s) of neighboring node name(s), and list(s) of link(s) therebetween.

Figure 10:
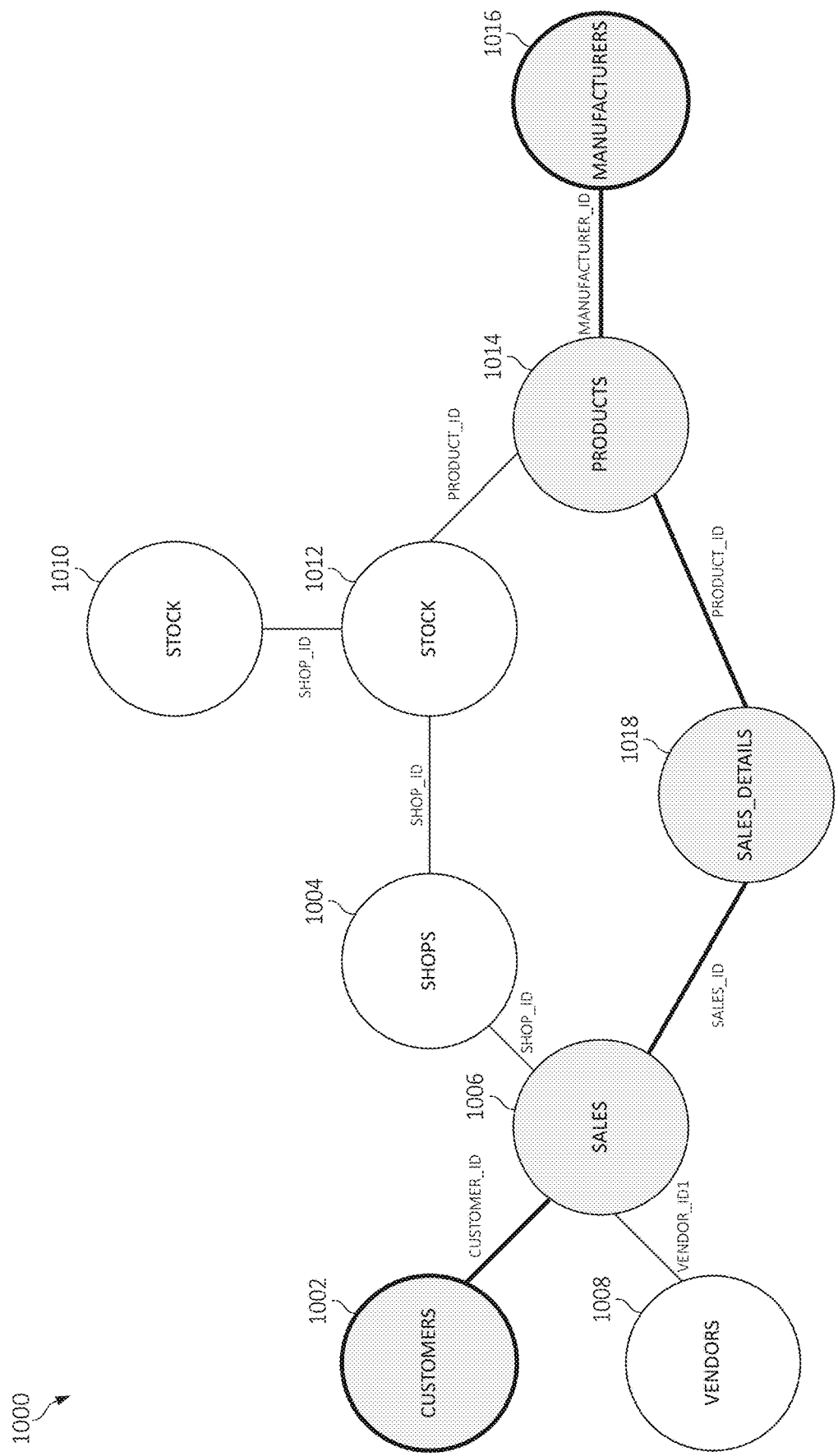
FIG. 10 is a block diagram of an exemplary join path utilizing an algorithm developed and implemented to find sets of shortest join paths covering a set of nodes (tables) in an implemented pseudo-SQL.

An algorithm for a resulting join path may then be developed and implemented to find the shortest join path that covers a set of nodes (tables) shown in the Pseudo-SQL. Turning now to FIG. 10, following, join path 1000 is shown following a determination of the shortest join path covering a particular set of nodes described in the Pseudo-SQL. Consider the following example input Pseudo-SQL string:

---
select CUSTOMERS.CUSTOMER_ID where
MANUFACTURERS.NAME = 'ABC'
---

As a result of the foregoing, the following nodes are input to a Full-SQL-Transform operation for generation of the "FROM" clause: [CUSTOMERS, MANUFACTURERS]

Turning again to FIG. 10, it may be determined that the shortest join path 1000 lies between customers node 1002, sales node 1006, sales_details node 1018, products node 1014, and manufacturers node 1016 as shading is indicated. Once the shortest join path 1000 is determined, the output, incorporating the "FROM" clause may be obtained as follows:

---
from MANUFACTURERS
inner join PRODUCTS on
MANUFACTURERS. MANUFACTURER_ID=PRODUCTS.MANUFACTURER_ID
inner join SALES_DETAILS on
PRODUCTS.PRODUCT_ID=SALES_DETAILS.PRODUCT_ID
inner join SALES SALES on
SALES_DETAILS.SALES_ID=SALES.SALES_ID
inner join CUSTOMERS on
SALES.CUSTOMER_ID=CUSTOMERS.CUSTOMER_ID
---

Taking the example Full-SQL-transform process thus described further, in one embodiment, column names may be sorted for each table in the schema description. Short names to use during training (e.g., name < > C1). Later, during inference, the shortened names in the Pseudo-SQL string may then be replaced back to the original names in the scheme (e.g., C1< > name). In a following step, values in question may be detected and replaced by an abbreviation (e.g., "TYPE_I_CASE_B" by "TICB"). During training, these values are then replaced in both the natural language question input and the resulting SQL queries. Turing a later inference phase, the shortened value is provided to the scheme description. And finally, during post-processing, the replace shortened values are replaced to the original values in the database.

Figure 11:
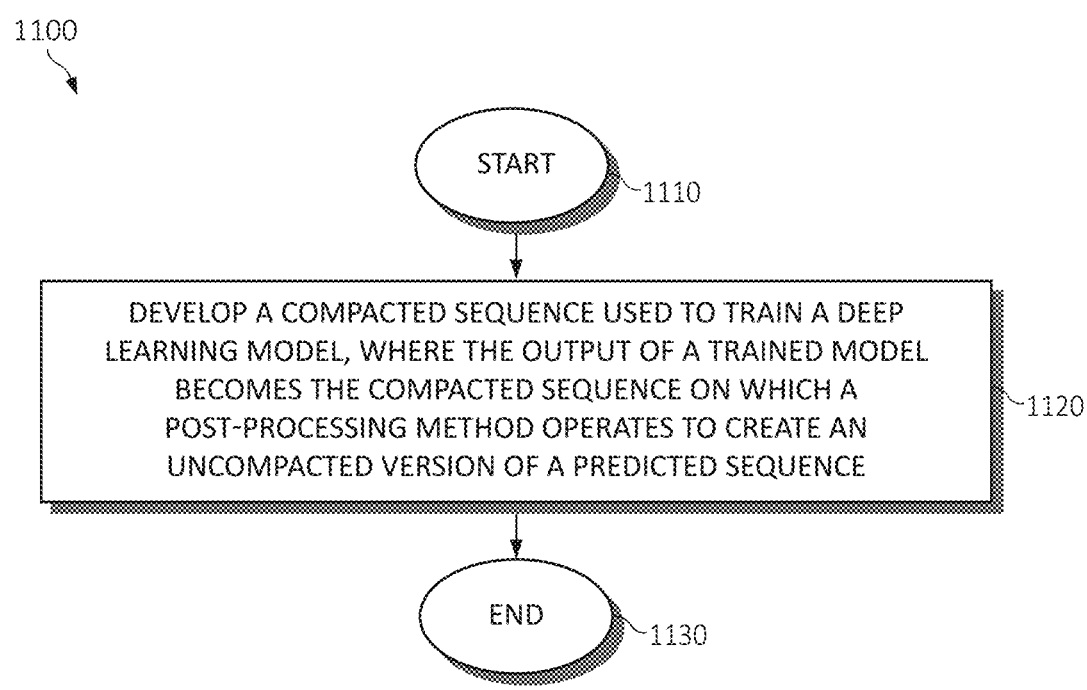
FIG. 11 is an additional flow chart diagram depicting additional various aspects for reducing interface time by implementing use of shortening an SQL query, in which an embodiment of the present invention may be implemented.

Turning now to FIG. 11, following, an exemplary method 1100 for decreasing a central processing unit (CPU) inference time, thereby shortening processing time of a deep learning model for which run-time complexity is proportional to an output sequence length, is depicted in accordance with one aspect of the mechanisms of the present invention. Method 1100 begins (step 1110) with the development of a compacted sequence used to train a deep learning model. The output thereof of a trained model thereby becomes the compacted sequence on which a post-processing method operates to create an uncompacted version of a predicted sequence (step 1120). Method 110 then ends (step 1130).

What is claimed is:

1. A method for decreasing a central processing unit (CPU) inference time, thereby shortening processing time of a deep learning model for which run-time complexity is proportional to an output sequence length, comprising:
receiving a structured query language (SQL) query; and
based on the SQL query, developing a compacted sequence that is used to train the deep learning model, wherein the developing further comprises transforming the SQL query by converting and compressing SQL statement components into a short-length pseudo-SQL sequence, wherein the converting and compressing further comprises automatically replacing at least one of a column name, a value in question, and a command by a shorter one of a column name, a shorter value in question, and a shorter command during training, and automatically reversing the shorter one of the column name, the shorter value in question, and the shorter command with the at least one of the column name, the value in question, and the command during inference, wherein an output of the trained model becomes the compacted sequence on which a post-processing method operates to create an uncompacted version of a predicted sequence.

2. The method of claim 1, further including:
using a formal language constrained to a grammar mechanism, and
implementing the grammar mechanism to create the uncompressed version of the predicted sequence.

3. The method of claim 1, further including executing the post-processing method, and creating the uncompacted version of the predicted sequence.

4. The method of claim 1, wherein developing the compacted sequence used to train the deep learning model further includes transforming the SQL query to the short-length pseudo-SQL sequence for training a Text-2-SQL DL model.

5. The method of claim 4, further including training the Text-2-SQL DL model on the short-length pseudo-SQL dataset.

6. The method of claim 5, further including shortening the length of the SQL query using an automatic Short-SQL-Transform process by removing a FROM clause.

7. A system for decreasing a central processing unit (CPU) inference time, thereby shortening processing time of a deep learning model for which run-time complexity is proportional to an output sequence length, comprising:
   one or more computers with executable instructions that when executed cause the system to receive a structured query language (SQL) query; and
   based on the SQL query, develop a compacted sequence that is used to train the deep learning model, wherein the developing further comprises transforming the SQL query by converting and compressing SQL statement components into a short-length pseudo-SQL sequence, wherein the converting and compressing further comprises automatically replacing at least one of a column name, a value in question, and a command by a shorter one of a column name, a shorter value in question, and a shorter command during training, and automatically reversing the shorter one of the column name, the shorter value in question, and the shorter command with the at least one of the column name, the value in question, and the command during inference, wherein an output of the trained model becomes the compacted sequence on which a post-processing method operates to create an uncompacted version of a predicted sequence.

8. The system of claim 7, wherein the executable instructions when executed cause the system to use a formal language constrained to a grammar mechanism, and implement the grammar mechanism to create the uncompacted version of the predicted sequence.

9. The system of claim 7, wherein the executable instructions when executed cause the system to execute the post-processing method, and create the uncompacted version of the predicted sequence.

10. The system of claim 7, wherein the executable instructions when executed cause the system to, pursuant to developing the compacted sequence used to train the deep learning model, transforming the SQL query to the short-length pseudo-SQL sequence for training a Text-2-SQL DL model.

11. The system of claim 10, wherein the executable instructions when executed cause the system to train the Text-2-SQL DL model on the short-length pseudo-SQL dataset.

12. The system of claim 11, wherein the executable instructions when executed cause the system to shorten the length of the SQL query using an automatic Short-SQL-Transform process by removing a FROM clause.

13. A computer program product for decreasing a central processing unit (CPU) inference time, thereby shortening processing time of a deep learning model for which run-time complexity is proportional to an output sequence length, the computer program product comprising:
   one or more computer readable storage media, and program instructions collectively stored on the one or more computer readable storage media, the program instruction comprising:
   program instructions to receive a structured query language (SQL) query; and
   program instructions to, based on the SQL query, develop a compacted sequence that is used to train the deep learning model, wherein the developing further comprises transforming the SQL query by converting and compressing SQL statement components into a short-length pseudo-SQL sequence, wherein the converting and compressing further comprises automatically replacing at least one of a column name, a value in question, and a command by a shorter one of a column name, a shorter value in question, and a shorter command during training, and automatically reversing the shorter one of the column name, the shorter value in question, and the shorter command with the at least one of the column name, the value in question, and the command during inference, wherein an output of the trained model becomes the compacted sequence on which a post-processing method operates to create an uncompacted version of a predicted sequence.

14. The computer program product of claim 13, further including program instructions to:
   use a formal language constrained to a grammar mechanism, and
   implement the grammar mechanism to create the uncompressed version of the predicted sequence.

15. The computer program product of claim 13, further including program instructions to execute the post-processing method, and create the uncompacted version of the predicted sequence.

16. The computer program product of claim 13, further including program instructions to transform the SQL query to the short-length pseudo-SQL sequence for training a Text-2-SQL DL model.

17. The computer program product of claim 16, further including program instructions to perform at least one of:
   training the Text-2-SQL DL model on the short-length pseudo-SQL dataset, and
   shortening the length of the SQL query using an automatic Short-SQL-Transform process by removing a FROM clause.

* * * * *